US012705783B2

(12) United States Patent
Shang

(10) Patent No.: US 12,705,783 B2
(45) Date of Patent: Aug. 11, 2026

(54) IDENTIFIER POSITIONING METHOD AND APPARATUS, ELECTRONIC DEVICE AND COMPUTER-READABLE STORAGE MEDIUM

(71) Applicant: GOERTEK INC., Weifang (CN)

(72) Inventor: Jiale Shang, Weifang (CN)

(73) Assignee: GOERTEK INC., Weifang (CN)

( * ) Notice: Subject to any disclaimer, the term of this patent is extended or adjusted under 35 U.S.C. 154(b) by 253 days.

(21) Appl. No.: 18/627,550

(22) Filed: Apr. 5, 2024

(65) Prior Publication Data

US 2024/0249429 A1 Jul. 25, 2024

Related U.S. Application Data

(63) Continuation of application No. PCT/CN2021/137852, filed on Dec. 14, 2021.

(30) Foreign Application Priority Data

Oct. 28, 2021 (CN) ......................... 202111266870.X

(51) Int. Cl.
*G06T 7/70* (2017.01)
*G06T 7/11* (2017.01)
*G06V 10/44* (2022.01)

(52) U.S. Cl.
CPC .................. *G06T 7/70* (2017.01); *G06T 7/11* (2017.01); *G06V 10/44* (2022.01); *G06V 2201/07* (2022.01)

(58) Field of Classification Search
CPC ..... G06T 7/70; G06T 7/11; G06T 7/73; G06T 7/90; G06T 2207/30204; G06V 10/44;
(Continued)

(56) References Cited

U.S. PATENT DOCUMENTS 9,781,393 B2 * 10/2017 Kudo ..................... H04N 23/76
2011/0274352 A1 * 11/2011 Blake ..................... G06T 7/194 382/173
(Continued)

FOREIGN PATENT DOCUMENTS

CN 104463108 A 3/2015
CN 107220726 A 9/2017
(Continued)

OTHER PUBLICATIONS

International Search Report and Written Opinion issued in International Application No. PCT/CN2021/137852; mailed Jul. 27, 2022; 13 pgs.
(Continued)

*Primary Examiner* — Xuemei G Chen
(74) *Attorney, Agent, or Firm* — HAUPTMAN HAM, LLP

(57) ABSTRACT

Disclosed are an identifier positioning method and apparatus, an electronic device and a computer-readable storage medium. The method includes: identifying the scene identifier of the scene area in the first scene image to obtain the scene identifier position; and selecting a coordinate point from the first scene image, extracting first feature information corresponding to the coordinate point, and recording the coordinate point position of the coordinate point respectively; identifying the identifier to be measured in the second scene image of the scene area to obtain the identifier position to be measured, and extracting second feature information at the identifier position to be measured; and finding the target coordinate point from coordinate points, and calculating a position of the identifier to be measured in the scene area according to a coordinate point position corresponding to the target coordinate point and the position of the scene identifier in the scene area.

9 Claims, 6 Drawing Sheets

(58) Field of Classification Search
CPC ... G06V 2201/07; G06V 10/462; G06F 18/00
See application file for complete search history.

(56) References Cited

U.S. PATENT DOCUMENTS

| | | | | |
|---|---|---|---|---|
| 2014/0355879 | A1* | 12/2014 | Agosta | G06T 7/143 382/199 |
| 2015/0310610 | A1* | 10/2015 | Ishihara | G06V 10/752 345/522 |
| 2020/0279397 | A1* | 9/2020 | Cheng | G06T 7/74 |
| 2020/0294197 | A1* | 9/2020 | Kawahara | G06T 3/60 |
| 2021/0110511 | A1* | 4/2021 | Huang | G06T 19/20 |
| 2021/0201068 | A1* | 7/2021 | Zhang | G06V 10/44 |
| 2021/0285782 | A1 | 9/2021 | Lai et al. | |
| 2021/0360368 | A1* | 11/2021 | Li | H04W 4/33 |
| 2022/0230350 | A1* | 7/2022 | Hur | G06F 16/532 |
| 2022/0300751 | A1* | 9/2022 | Akiyama | G06V 10/40 |
| 2022/0327729 | A1* | 10/2022 | Lee | G06T 7/70 |
| 2022/0366576 | A1* | 11/2022 | Wang | G06T 7/248 |
| 2023/0015751 | A1* | 1/2023 | Serackis | G06T 7/251 |
| 2023/0368338 | A1* | 11/2023 | Li | G06T 5/70 |
| 2023/0386077 | A1* | 11/2023 | Morishita | G06T 7/70 |

FOREIGN PATENT DOCUMENTS

| | | | |
|---|---|---|---|
| CN | 108389264 | A | 8/2018 |
| CN | 108629248 | A | 10/2018 |
| CN | 111467806 | A | 7/2020 |
| CN | 112598738 | A | 4/2021 |
| CN | 112927363 | A | 6/2021 |
| CN | 112991456 | A | 6/2021 |
| CN | 113393506 | A | 9/2021 |
| CN | 114120085 | A | 3/2022 |

OTHER PUBLICATIONS

Grant Notice in Corresponding Chinese Application No. 202111266870.X, dated Mar. 3, 2025; 5 pgs.

Bruns, C., “The influence of landmarks and urban form on cognitive maps using virtual reality,” Kansas State University, dated May 1, 2018; 100 pgs.

First Office Action in Corresponding Chinese Application No. 202111266870.X, dated Oct. 13, 2024; 12 pgs.

Ma, W., “Scene understanding based research for Indoor augmented reality visualization,” Wuhan University, dated Apr. 2018; 101 pgs.

Zhou, Z. et al., “Target Location and Recognition Based on Kinect Depth Image,” Machinery Manufacturing and Automation, dated Aug. 2016; 5 pgs.

* cited by examiner

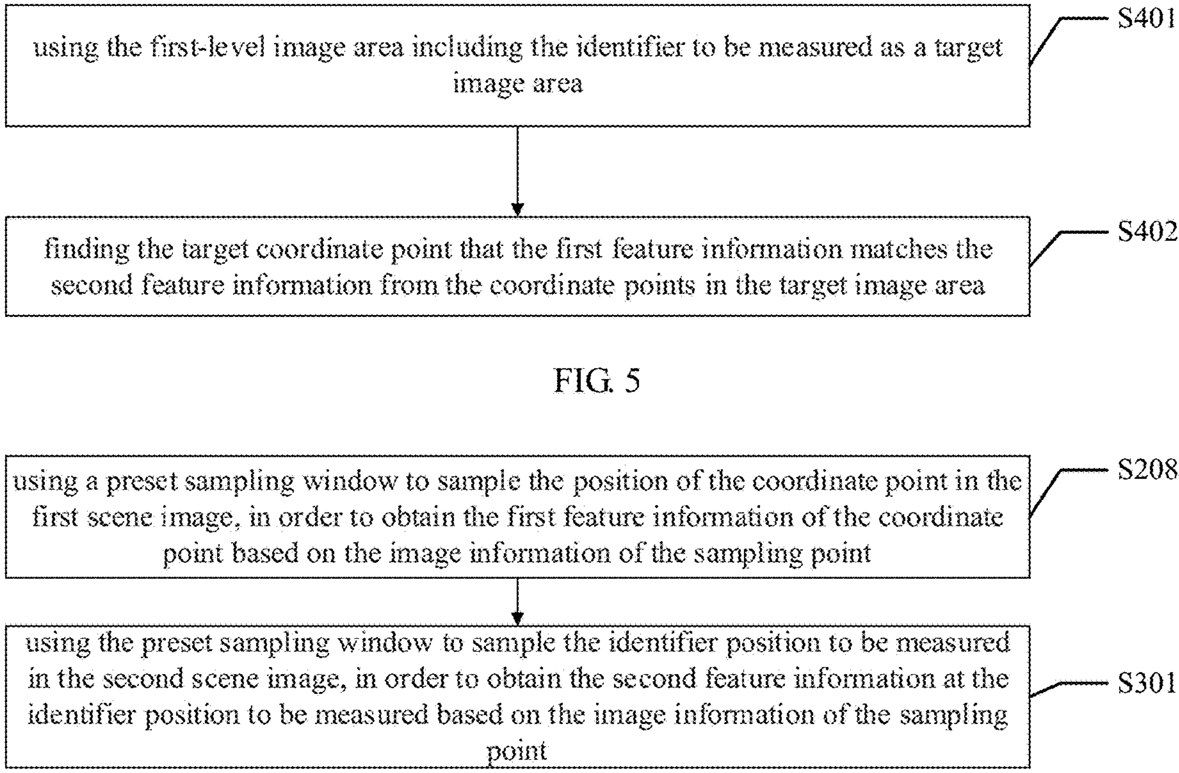
using the first-level image area including the identifier to be measured as a target image area
S401
finding the target coordinate point that the first feature information matches the second feature information from the coordinate points in the target image area
S402
FIG. 5
using a preset sampling window to sample the position of the coordinate point in the first scene image, in order to obtain the first feature information of the coordinate point based on the image information of the sampling point
S208
using the preset sampling window to sample the identifier position to be measured in the second scene image, in order to obtain the second feature information at the identifier position to be measured based on the image information of the sampling point
S301
FIG. 6 imaging device scene area

IDENTIFIER POSITIONING METHOD AND APPARATUS, ELECTRONIC DEVICE AND COMPUTER-READABLE STORAGE MEDIUM

CROSS-REFERENCE TO RELATED APPLICATIONS

The present application is a continuation application of International Application No. PCT/CN2021/137852, filed on Dec. 14, 2021, which claims priority to Chinese Patent Application No. 202111266870.X, filed on Oct. 28, 2021. The disclosures of the above-mentioned applications are incorporated herein by reference in their entireties.

TECHNICAL FIELD

The present application relates to the technical field of image processing, and in particular to an identifier positioning method and apparatus, an electronic device and a computer-readable storage medium.

BACKGROUND

At present, in some application fields, it is necessary to position users who move in large scenes in real time. For example, users wearing virtual reality (VR)/augmented reality (AR) devices move in the scene, and obtain the experience of overlaying virtual scenes with real scenes. However, the current large-scene positioning technology mostly relies on expensive external auxiliary devices, such as providing dense positioning devices such as sensors in the scene to capture specific positions in the scene, which incurs high hardware costs.

SUMMARY

The main purpose of the present application is to provide an identifier positioning method and apparatus, an electronic device and a computer-readable storage medium, aiming to solve the existing technical problem of high hardware cost when relying on expensive external auxiliary devices for positioning user in large scenes.

In order to achieve the above purpose, the present application provides an identifier positioning method, which includes:

identifying a scene identifier of a scene area in a first scene image to obtain a scene identifier position of the scene identifier in the first scene image;

selecting a plurality of coordinate points from the first scene image, extracting first feature information corresponding to each of the coordinate points according to image information of the first scene image, and recording a coordinate point position of each of the coordinate points in the first scene image relative to the scene identifier position;

identifying an identifier to be measured in a second scene image of the scene area to obtain an identifier position to be measured, and extracting second feature information at the identifier position to be measured according to the identifier position to be measured; and finding a target coordinate point where the first feature information matches the second feature information from each of the coordinate points, and calculating a position of the identifier to be measured in the scene area according to a coordinate point position corresponding to the target coordinate point and the position of the scene identifier in the scene area.

In an embodiment, the scene identifier is arranged at each end point of the scene area, each of the end points are enclosed to form the scene area, and selecting the plurality of coordinate points from the first scene image includes:

extracting a feature point in the first scene image;

determining a centroid of the first scene image, and dividing the first scene image into a plurality of first-level image areas according to a connecting line between each of the scene identifiers and the centroid; and selecting at least one feature point from the first-level image area as a coordinate point.

In an embodiment, after determining the centroid of the first scene image, and dividing the first scene image into the plurality of first-level image areas according to the connecting line between each of the scene identifiers and the centroid, the method further includes:

using the centroid as a root node of a multi-fork tree, using each of the first-level image areas as a sub-node of the root node in the multi-fork tree, and initializing a target node as the root node;

determining whether a number of feature points in an image area of each sub-node of the target node is greater than a preset number; and in response to that the number of feature points in the image area of each sub-node of the target node is not greater than the preset number, determining one of the feature points from the image area of each sub-node of the target node as a coordinate point in a corresponding image area.

In an embodiment, after determining whether the number of feature points in the image area of each sub-node of the target node is greater than the preset number, the method further includes:

in response to that the number of feature points in the image area of each sub-node of the target node is greater than the preset number, dividing the image area of each sub-node of the target node into a plurality of image areas of secondary level, using each of the image areas of secondary level as a sub-node corresponding to the image area of first level, updating the target node to each sub-node of the target node in sequence, and determining whether the number of feature points in the image area of each sub-node of the target node is greater than the preset number.

In an embodiment, determining one of the feature points from the image area of each sub-node of the target node as the coordinate point in the corresponding image area includes:

in response to that there are multiple feature points in the image area of the sub-node of the target node, selecting a feature point with a largest grayscale environment gradient value from the multiple feature points as the coordinate point in the image area.

In an embodiment, finding the target coordinate point where the first feature information matches the second feature information from each of the coordinate points includes:

using the first-level image area comprising the identifier to be measured as a target image area; and finding the target coordinate point where the first feature information matches the second feature information from each of the coordinate points in the target image area.

In an embodiment, finding the target coordinate point where the first feature information matches the second feature information from each of the coordinate points in the target image area includes:

performing a first order traversal in the multi-fork tree starting from the sub-node corresponding to the target image area, to find the target coordinate point where the first feature information matches the second feature information from each of the coordinate points.

In an embodiment, extracting the first feature information corresponding to each of the coordinate points according to the image information of the first scene image includes:

sampling the position of the coordinate point in the first scene image using a preset sampling window to obtain the first feature information of the coordinate point based on the image information of the sampling point;

extracting the second feature information at the identifier position to be measured according to the image information of the second scene image includes:

sampling the identifier position to be measured in the second scene image using the preset sampling window to obtain the second feature information at the identifier position to be measured based on the image information of the sampling point.

In an embodiment, sampling the position of the coordinate point in the first scene image using the preset sampling window to obtain the first feature information of the coordinate point based on the image information of the sampling point further includes:

obtaining the initial sampling window as the current sampling window, and sampling the position of the coordinate point in the first scene image using the current sampling window to obtain the current feature information of the coordinate point based on the image information of the sampling point;

using each of the coordinate points as a target point in turn, determining a preset number of adjacent coordinate points closest to the target point in the first scene image, and calculating a feature difference value between the current feature information of the target point and the current feature information of the adjacent coordinate points;

summing the feature difference value corresponding to each coordinate point to obtain a total difference value, subtracting the total difference value from the first preset threshold to obtain a difference, and determining whether the difference is less than a second preset threshold;

if the difference is less than the second preset threshold, using the current sampling window as the preset sampling window; or if the difference is not less than the second preset threshold, updating the window parameters of the current sampling window, and sampling the position of the coordinate point in the first scene image using the current sampling window to obtain the current feature information of the coordinate point based on the image information of the sampling point.

In an embodiment, the preset sampling window is a circular sampling window, and sampling the position of the coordinate point in the first scene image using the preset sampling window to obtain the first feature information of the coordinate point based on the image information of the sampling point includes:

placing the center of the circular sampling window at the coordinate point in the first scene image, sampling from the circular sampling window to obtain N sampling points, and obtaining the grayscale values of the N sampling points according to the image information of the first scene image;

if the grayscale value of the i-th sampling point is greater than the grayscale value of the (i+1)-th sampling point, setting the description information of the i-th sampling point to 1, where $1 \leq i \leq N-1$;

if the grayscale value of the i-th sampling point is not greater than the grayscale value of the (i+1)-th sampling point, setting the description information of the i-th sampling point to 0; and obtaining the first feature information of the coordinate point according to the description information of the 1st to (N−1) sampling points.

The present application also provides an identifier positioning apparatus, including:

an identification module, configured to identify a scene identifier of a scene area in a first scene image to obtain a scene identifier position;

a first extraction module, configured to select a plurality of coordinate points from the first scene image, extract first feature information corresponding to each of the coordinate points according to image information of the first scene image, and respectively record a coordinate point position of each of the coordinate points relative to the scene identifier position in the first scene image;

a second extraction module, configured to identify an identifier to be measured in a second scene image of the scene area to obtain an identifier position to be measured, and extract second feature information at the identifier position to be measured according to the identifier position to be measured; and a match module, configured to find a target coordinate point that the first feature information matches the second feature information from each of the coordinate points, and calculate a position of the identifier to be measured in the scene area according to a coordinate point position corresponding to the target coordinate point and the scene identifier position.

The present application also provides an electronic device, which is a physical device. The electronic device includes a memory, a processor and a program for the identifier positioning method stored on the memory and executable on the processor, and when the program for the identifier positioning method is executed by the processor, the identifier positioning method as described above can be implemented.

The present application also provides a computer-readable storage medium, a program for implementing the identifier positioning method is stored in the computer-readable storage medium, and when the program for the identifier positioning method is executed by the processor, the identifier positioning method as described above is implemented.

The present application provides an identifier positioning method and apparatus, an electronic device and a computer-readable storage medium. In the method of the present application, identifying the scene identifier of the scene area in the first scene image by arranging the scene identifier in the scene area, to obtain the scene identifier position of the scene identifier in the first scene image; selecting a plurality of coordinate points from the first scene image, extracting first feature information corresponding to each of the coordinate points according to the image information of the first scene image, and recording the coordinate point position of each coordinate point in the first scene image relative to the scene identifier position; obtaining the second scene image of the target user who is active, identifying the identifier to be measured in the the second scene image of the scene area to obtain the identifier position to be measured, and extracting the second feature information at the identifier position to be measured according to the identifier position to be measured; and finding the target coordinate point where the first feature information matches the second feature information from each coordinate point, and calculating the position of the identifier to be measured in the scene area according to the coordinate point position corresponding to the target coordinate point and the position of the scene identifier in the scene area. The present application provides a purely visual user positioning solution. The user's position in the scene area can be obtained by only setting some scene identifiers in the scene area and through image recognition and feature comparison. Compared with current large-scene positioning method that rely on expensive external auxiliary devices, the user positioning solution provided by the present application greatly reduces hardware costs.

BRIEF DESCRIPTION OF THE DRAWINGS

In order to describe the technical solutions in the embodiments of the present application or in the related art more clearly, the accompanying drawings required to be used in the description of the embodiments or the related art will be briefly introduced below. Obviously, the accompanying drawings in the following description are only some embodiments of the present application. For those skilled in the art, other drawings can be obtained based on the structures shown in these drawings without creative efforts.

FIG. 5 is a schematic flowchart of an identifier positioning method according to an embodiment of the present application.

FIG. 6 is a schematic flowchart of an identifier positioning method according to an embodiment of the present application.

DETAILED DESCRIPTION OF THE EMBODIMENTS

The technical solutions in the embodiments of the present application will be described below with reference to the accompanying drawings in the embodiments of the present application. Obviously, the described embodiments are only some rather than all of the embodiments of the present application. Based on the embodiments in the present application, all other embodiments obtained by those skilled in the art without creative efforts fall within the scope of the present application.

First Embodiment

Figures 1, 2:
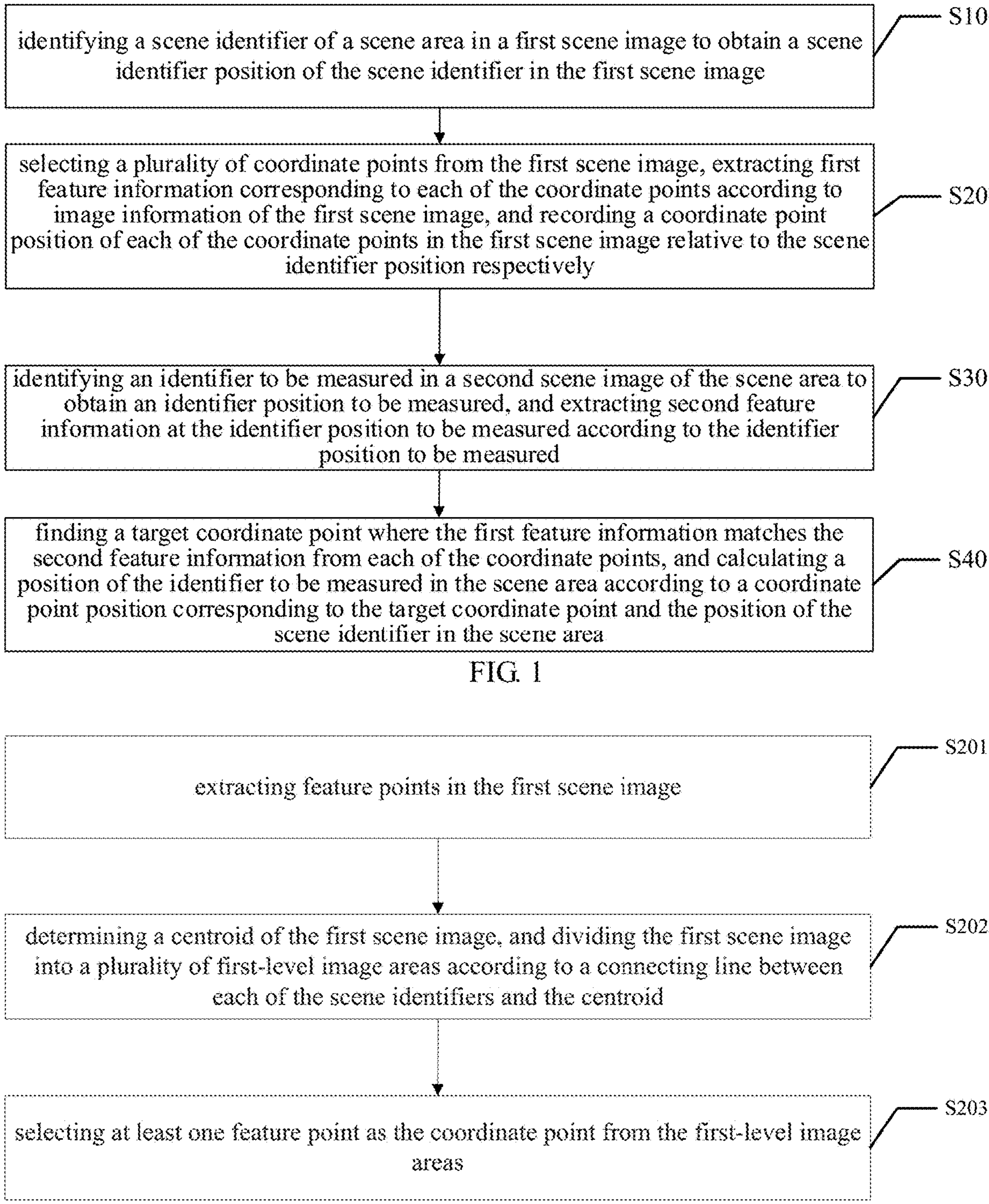
FIG. 1 is a schematic flowchart of an identifier positioning method according to an embodiment of the present application.
FIG. 2 is a schematic flowchart of an identifier positioning method according to an embodiment of the present application.

As shown in FIG. 1, an identifier positioning method provided by an embodiment of the present application includes:

Step S10, identifying a scene identifier of a scene area in a first scene image to obtain a scene identifier position of the scene identifier in the first scene image.

In this embodiment, in order to solve the technical problem of high hardware cost in relying on expensive external auxiliary devices for positioning user in large scenes, a purely visual identifiers positioning method is proposed to locate the user's position in the scene area, but it is not limited to position the user in large scenes, that is, it can also be used to position other objects in the scene. In the following embodiments, user positioning is taken as an example for explanation.

The scene area can be any selected area where the user moves. For example, in an embodiment, the shopping area of a supermarket is defined as a scene area, at least one user wears a VR or AR device and moves in the scene area, and uses the VR or AR device to view a virtual scene combined with the real scene area to achieve a shopping or gaming experience of virtuality and reality combination. In this process, it is necessary to position the user's location in the scene area, which is reflected in the virtual scene.

Some scene identifiers can be arranged in the scene area. The physical form of the scene identifier is not limited in this embodiment. However, when the scene identifier is photographed into the image, the position of the scene identifier in the image can be identified through image recognition. For example, in some embodiments, the scene identifier can be an eye-catching marker, a QR code carrying information, a flashing light, etc. The number of scene identifiers can be one or more, which is not limited in this embodiment. It can be understood that since the scene identifier is artificially arranged in the scene area, the position of the scene identifier in the scene area can be tested in advance.

The image of the scene area (hereinafter referred to as the first scene image) can be captured by a camera device, or the first scene image of the scene area can be collected by other image acquisition devices, which is not limited in this embodiment. The first scene image contains the entire scene area. In an embodiment, the first scene image can be an image containing the entire scene area. This image can be obtained by photographing the scene area from at a bird's-eye angle through an imaging device with a large field of view, or can be obtained by photographing multiple images of different small areas of the scene area at the bird's-eye angle using the imaging device and then stitching the multiple images together. In another embodiment, the first scene image can also be multiple images, and the areas included in the multiple images are combined to form the scene area. Correspondingly, in the areas included in the multiple images, at least one scene identifier is provided respectively.

The first scene image of the scene area is obtained and identified to obtain the position of the scene identifier in the first scene image (hereinafter referred to as the scene identifier position). Specifically, depending on the entity form of the scene identifier, there may be certain differences in the specific implementation methods for identifying the position of the scene identifier in the first scene image. For example, in an embodiment, when the scene identifier is an eye-catching mark or a flashlight, an image of the scene identifier (called an identifier image) can be captured separately in advance, and the image information of each pixel of the identifier image and the first scene image can be matched. If an image area in the first scene image matches the identifier image successfully, the position of the image area (or a point that can represent the area) in the first scene image is used as the position of the scene identifier in the first scene image. The matching method of the two image areas is not limited in this embodiment.

Step S20, selecting a plurality of coordinate points from the first scene image, extracting first feature information corresponding to each of the coordinate points according to image information of the first scene image, and recording a coordinate point position of each of the coordinate points in the first scene image relative to the scene identifier position respectively.

After obtaining the first scene image, multiple coordinate points can be selected from the first scene image. In an embodiment, the method of selecting coordinate points and the number of coordinate points are not limited in this embodiment. For example, in an embodiment, an image coordinate system can be established in the first scene image, some coordinate values can be selected from each coordinate axis of the image coordinate system in a equal sampling manner, and the points defined by the coordinate values selected on each coordinate axis is used as the coordinate points.

After the coordinate points are selected, the position of each coordinate point relative to the scene identifier position in the first scene image (hereinafter referred to as the coordinate point position) can be recorded. That is, the position of the coordinate point in the first scene image can be determined according to the coordinate point position and the scene identifier position. In an embodiment, when there are three or more scene identifiers, the coordinate point position can only include the distance between the coordinate point and each scene identifier position in the first scene image. The position of the coordinate point in the first scene image can be obtained according to the distance between the coordinate point and multiple scene identifier positions. In another embodiment, when there are three or fewer scene identifiers, the coordinate point position can include, in addition to the distance between the coordinate point and each scene identifier position in the first scene image, a direction of the coordinate point in the first scene image relative to the scene identifier position.

After the coordinate points are selected, feature information corresponding to each coordinate point (hereinafter referred to as first feature information) can be extracted according to the image information of the first scene image. The image information can include information such as grayscale values and RGB values of pixels. The first feature information is used to describe the features exhibited by the image information of the coordinate points or a certain range of pixels around it. The method of extracting the first feature information is not limited in this embodiment. For example, in an embodiment, an ORB algorithm can be used to extract the feature vector of the coordinate point, and the feature vector is used as the first feature information of the coordinate point.

Further, in some embodiments, after obtaining the first feature information and coordinate point position of each coordinate point, each scene identifier arranged in the scene area can be removed.

Step S30, identifying the identifier to be measured in a second scene image of the scene area to obtain an identifier position to be measured, and extracting second feature information at the identifier position to be measured according to the identifier position to be measured.

When a user moves in the scene area and it is necessary to locate the user's position in the scene area, each user who needs to be located is called a target user. A second scene image of the scene area can be obtained. The second scene image can be the first scene image, or an image obtained at a different time than the first scene image. For example, an imaging device can be used to capture an image of the target user who moves in the scene area in real time as the second scene image. In a specific implementation, the imaging device can be fixedly installed above the scene area, or can be controlled mechanically or manually to move and follow the target user.

The target user can carry a user identifier. Similar to the scene identifier, the entity form of the user identifier is not limited in this embodiment. However, when the user identification is captured in an image, the position of the user identifier in the image can be identified through image recognition. When there are multiple users, the user identifier of each user is distinctive, that is, different user identifiers can be distinguished through image recognition, for example, using markers of different shapes, QR codes carrying different user numbers, and flashlights of different colors, etc. Furthermore, in some embodiments, if the scene identifier in the scene area has not been removed, the user identifier and the scene identifier are also distinctive. The user identifier is referred to as the identifier to be measured below.

After obtaining the second scene image, the second scene image is identified to obtain the position of the identifier to be measured in the second scene image (hereinafter referred to as the identifier position to be measured). The specific identification method can refer to the identification method of the scene identifier position, and will not be repeated here.

After the identifier position to be measured is identified, feature information at the identifier position to be measured (hereinafter referred to as second feature information) can be extracted according to the image information of the second scene image. The image information can include information such as grayscale values and RGB values of pixels. The second feature information is used to describe the features exhibited by the image information of pixels in a certain range at or around the identifier position to be measured. The method of extracting the second feature information is not limited in this embodiment. For example, in an embodiment, an ORB algorithm can be used to extract the feature vector at the identifier position to be measured, and the feature vector is used as the second feature information at the identifier position to be measured. In order to improve the matching accuracy of subsequent feature information, the same extraction method can be used for the first feature information and the second feature information.

Step S40, finding a target coordinate point where the first feature information matches the second feature information from each of the coordinate points, and calculating the position of the identifier to be measured in the scene area according to the coordinate point position corresponding to the target coordinate point and the position of the scene identifier in the scene area.

After obtaining the second feature information, the second feature information can be matched with the first feature information of each coordinate point, the first feature information matching the second feature information can be found, and the coordinate point corresponding to the first feature information matching the second feature information can be used as the target coordinate point. The matching method of the first feature information and the second feature information is not limited in this embodiment. For example, when the first feature information and the second feature information are feature vectors extracted using the ORB algorithm, the method of calculating the Hamming distance can be used to determine whether the two feature information match. When the Hamming distance between the two feature information is less than a certain distance, it is determined that the two feature information matches, otherwise, it is determined that the two feature information does not match. Further, if multiple Hamming distances of the first feature information and the second feature information are all less than a certain distance, the first feature information with the smallest Hamming distance from the second feature information can be selected, and the first feature information can be used as the feature information that matches the second feature information.

After the target coordinate point is found, the position of the identifier to be measured in the scene area can be calculated according to the coordinate point position corresponding to the target coordinate point and the position of the scene identifier in the scene area. It can be understood that since the position of the scene identifier in the scene area is known, the distance between each scene identifier in the scene area is also known. After obtaining the position of the scene identifier, the distance between each scene identifier in the scene image can also be calculated, and then the scale of the first scene image and the scene area can be calculated. According to the scale, the coordinate point position of the target coordinate point (the position of the target coordinate point in the first scene image relative to the scene identifier position) can be converted into the position of the identifier to be measured in the scene area relative to the scene identifier. The position of the scene identifier in the scene area is known, and thus the position of the identifier to be measured in the scene area can be calculated. It can be understood that when the identifier to be measured is a user identifier carried by the user, the calculated position of the identifier to be measured in the scene area is the position of the user in the scene area.

In this embodiment, the scene identifier of the scene area in the first scene image is identified by arranging the scene identifier in the scene area to obtain the scene identifier position of the scene identifier in the first scene image. Multiple coordinate points are selected in the first scene image, the first feature information corresponding to each coordinate point is extracted according to the image information of the first scene image, and the coordinate point position of each coordinate point relative to the scene identifier position in the first scene image is recorded. The second scene image of the target user who moves in the scene area is obtained, the identifier to be measured in the second scene image of the scene area is identified to obtain the identifier position to be measured, and the second feature information at the identifier position to be measured is extracted according to the identifier position to be measured. The target coordinate point where the first feature information matches the second feature information in the coordinate points is found, and the position of the identifier to be measured in the scene area is calculated according to the position of the coordinate point corresponding to the target coordinate point and the position of the scene identifier in the scene area. This embodiment provides a purely visual user positioning solution, in which only some scene identifiers are set in the scene area, and the user's position in the scene area can be obtained through image recognition and feature comparison. Compared with the current large scene positioning method that relies on expensive external auxiliary devices, the user positioning solution provided by this embodiment greatly reduces hardware costs.

Second Embodiment

On the basis of the first embodiment, the scene identifiers in the above embodiment are provided at each endpoint of the scene area, and the endpoints encloses to form the scene area. As shown in FIG. 2, selecting the plurality of coordinate points from the first scene image in the step S20 can include steps S201 to S203, and this situation will be introduced below. In this embodiment, content that is the same or similar to the above-mentioned first embodiment can be referred to the above description, and will not be repeated again.

Step S201, extracting feature points in the first scene image.

Since the scene area is not necessarily a regular shape like a quadrilateral, in this embodiment, a solution for dynamically selecting coordinate points in the scene area through an adaptive multi-fork tree is proposed.

Figures 8, 9:
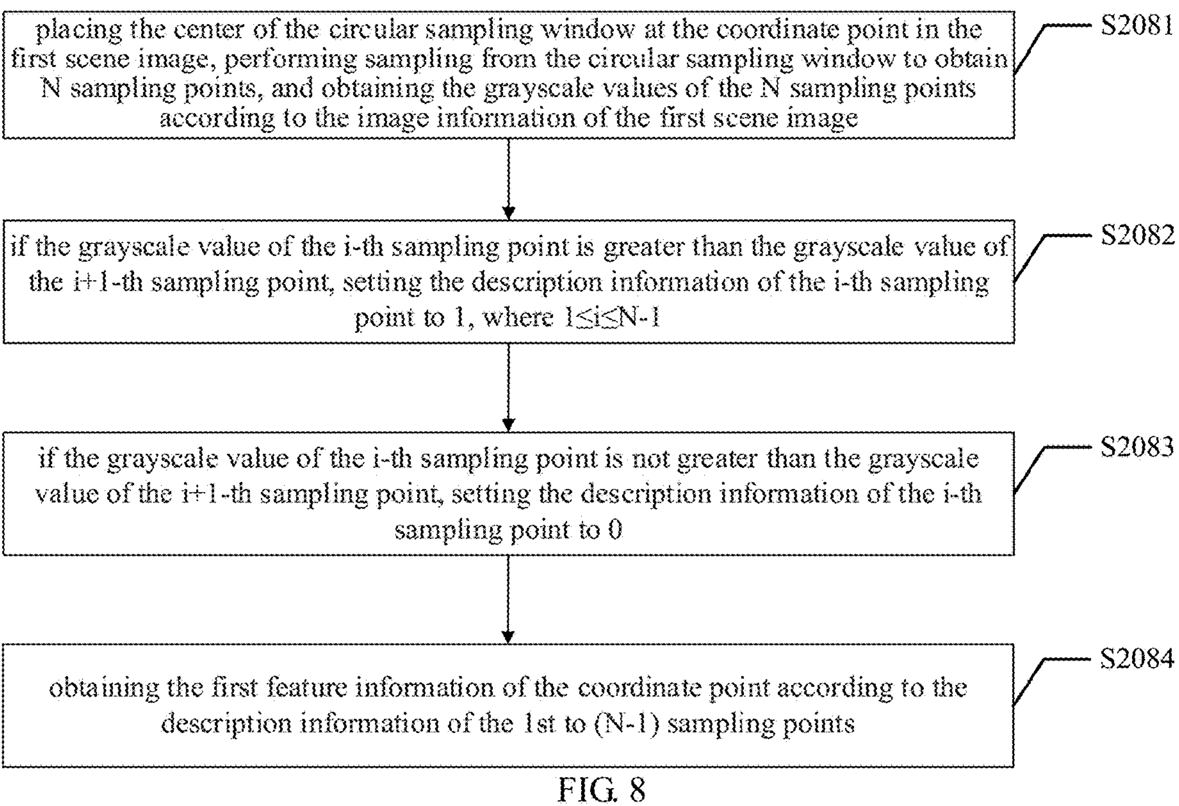
FIG. 8 is a schematic flowchart of an identifier positioning method according to an embodiment of the present application.
FIG. 9 is a schematic diagram of a scene area involved in the identifier positioning method according to an embodiment of the present application.

Specifically, the scene identifier can be arranged at each endpoint of the scene area, and each endpoint encloses the scene area. For example, FIG. 9 shows a pentagonal scene area, and the endpoints are the vertices of the pentagon. FIG. 9 also shows a possible installation angle of the imaging device, and the first scene image of the pentagonal scene area is captured by the imaging device.

A preset feature point extraction algorithm can be used to extract feature points in the first scene image. Generally, there are multiple identified feature points. The preset feature point extraction algorithm can be set as needed, and is not limited in this embodiment. For example, the ORB (Oriented FAST and Rotated BRIEF,) algorithm can be used to extract feature points. It can be understood that there may be some small areas with rich visual features such as color and texture in the scene area. Correspondingly, these small areas will have more corresponding feature points in the first scene image.

Step S202, determining a centroid of the first scene image, and dividing the first scene image into a plurality of first-level image areas according to a connecting line between each of the scene identifiers and the centroid.

Figure 10:
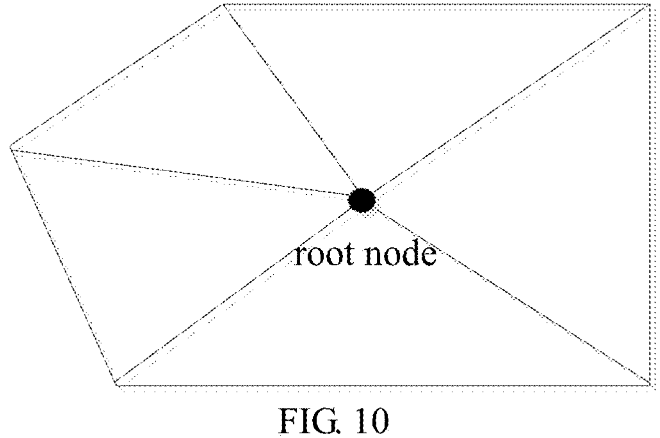
FIG. 10 is a schematic diagram of the scene image area division involved in the identifier positioning method according to an embodiment of the present application.

After the scene identifier position of each scene identifier in the first scene image is identified, the centroid of each scene identifier in the first scene image can be determined according to each scene identifier position as the centroid of the first scene image, or the centroid of the first scene image can be directly determined. The first scene image can be divided into multiple image areas (hereinafter referred to as the first-level image area) according to the connection between each scene identifier and the centroid. As shown in FIG. 10, the first scene image corresponding to the scene area is a pentagonal image. The first scene image can be divided into five first-level image areas according to the connection between each scene identifier and the centroid.

Step S203, selecting at least one feature point as the coordinate point from the first-level image areas.

After obtaining the first-level image areas, at least one feature point can be selected as the coordinate point from each first-level image area. Specifically, in an embodiment, a number can be set, and a set number of feature points are selected as coordinate points from each first-level image area, that is, the number of coordinate points in each first-level image area is the same, so that the distribution of coordinate points in the first scene image is relatively uniform. Further, in an embodiment, for each first-level image area, if the number of feature points in the first-level image area is multiple, the gradient values of the multiple feature points in a gray scale environment can be calculated. The feature point whose gradient value ranks in front of a preset number of digits is selected from the feature points as the coordinate point in the first-level image area, so as to select a set number of coordinate points. The features of feature points with large gradient values are more significant, so selecting feature points with large gradient values as coordinate points can make the features of the coordinate points more significant.

Figures 3, 4:
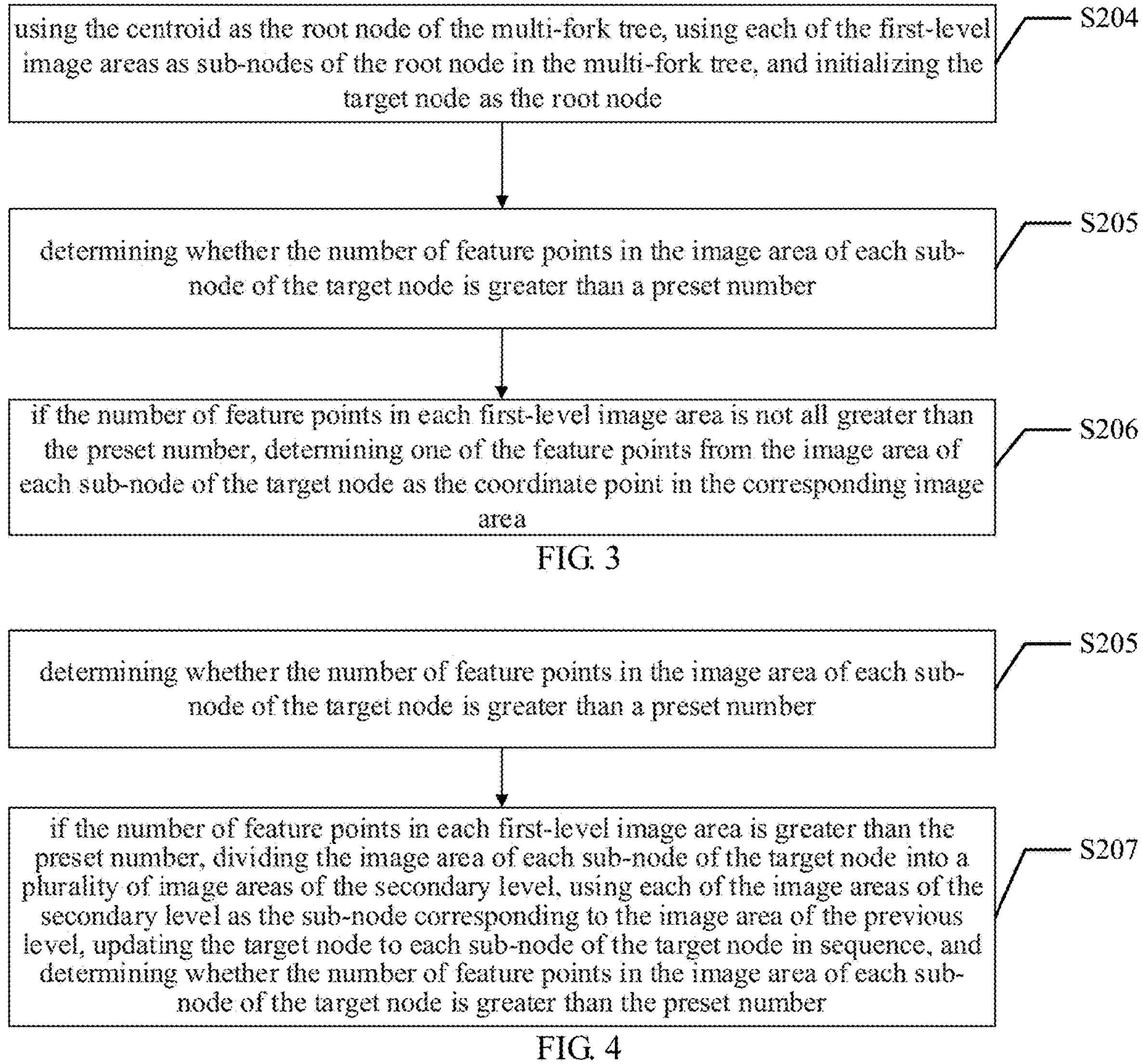
FIG. 3 is a schematic flowchart of an identifier positioning method according to an embodiment of the present application.
FIG. 4 is a schematic flowchart of an identifier positioning method according to an embodiment of the present application.

Further, in an embodiment, as shown in FIG. 3, steps S204 to S206 can be included after step S202. In another embodiment, steps S204 to S206 can be executed in parallel with step S203, or can be executed selectively with step S203. That is, steps S204 to S206 or step S203 are executed after step S202.

Step S204, using the centroid as the root node of the multi-fork tree, using each of the first-level image areas as sub-nodes of the root node in the multi-fork tree, and initializing the target node as the root node.

After determining the centroid and obtaining the first-level image area, the centroid can be used as the root node of the multi-fork tree, and the multi-fork tree can be dynamically constructed starting from the root node. Specifically, each first-level image area can be regarded as a sub-node of the root node in the multi-fork tree, which can be understood that one sub-node corresponds to one first-level image area. A target node can be defined, and the target node can be initialized as the root node.

Step S205, determining whether the number of feature points in the image area of each sub-node of the target node is greater than a preset number.

For the target node, it is determined that whether the number of feature points in the image area of each sub-node of the target node is greater than the preset number. It can be understood that when the target node is the root node, the sub-nodes of the target node are each first-level image area, and it is determined whether the number of feature points in each first-level image area is greater than the preset number. The preset number can be set as needed. When denser coordinate points need to be selected, the preset number can be set smaller. For example, in an embodiment, the preset number can be set to 1.

Step S206, if the number of feature points in each first-level image area is not all greater than the preset number, determining one of the feature points from the image area of each sub-node of the target node as the coordinate point in the corresponding image area.

If the number of feature points in the image area of each sub-node of the target node is not all greater than the preset number, that is, the number of feature points in at least one image area is less than the preset number, it means that there is no need to further divide the image area of this level. At this time, a feature point can be determined from the image area of each sub-node of the target node as the coordinate point in the corresponding image area. It can be understood that if there is only one feature point in the image area, the feature point can be used as the coordinate point in the image area; if there are no feature points in the image area, the nodes corresponding to the image area can be deleted from the multi-fork tree, or the centroid of the image area is selected as the coordinate point in the image area; if there are multiple feature points in the image area, one feature point can be selected as the coordinate point, in order to ensure uniformity of coordinate point selection and avoid the waste of computing resources caused by excessively dense calibration of coordinate points in a small local area with rich visual features in the first scene image.

Further, in an embodiment, as shown in FIG. 4, after step S205, the method can also include:

step S207, if the number of feature points in each first-level image area is greater than the preset number, dividing the image area of each sub-node of the target node into a plurality of image areas of the secondary level, using each of the image areas of the secondary level as the sub-node corresponding to the image area of the previous level, updating the target node to each sub-node of the target node in sequence, and determining whether the number of feature points in the image area of each sub-node of the target node is greater than the preset number.

If the number of feature points in the image area of each sub-node of the target node is greater than the preset number, it means that the image area of this level can be further divided into more finer, and denser coordinate points can be selected to achieve a more accurate positioning effect. At this time, the image area of each sub-node of the target node can be further divided into multiple image areas. For the image area to be divided, the divided image area is the image area of the secondary level of the image area to be divided, that is, the image area obtained by dividing the first-level image area is the second-level image area, the image area obtained by dividing the second-level image area is the third-level image area, and so on.

The method of dividing the image area of each sub-node of the target node into image areas of the secondary level is not limited in this embodiment. For example, in an embodiment, the image area can be divided into three parts by connecting the centroid and endpoints of the image area to obtain three image areas of secondary level.

For the divided sub-level image area, the image area is used as a sub-node corresponding to the image area of the upper level. The image area at the upper level corresponding to the image area at the next level is the image area that divides the image area at the next level. That is, each second-level image area obtained by dividing a first-level image area is used as the sub-node of the first-level image area, each third-level image area obtained by dividing a second-level image area is used as the sub-node of the second-level image area, and so on.

After obtaining the sub-nodes of the sub-nodes of the target node, each sub-node of the target node can be updated to the target node in sequence, and for the target node after each update, step S204 is performed, so as to achieve the purpose of constructing a multi-fork tree iteratively. It can be understood that the multi-fork tree is constructed through loop iteration, and the image area corresponding to each leaf node of the multi-fork tree has one coordinate point.

In this embodiment, the scene identifier is set at the endpoint of the scene area, and the first scene image is divided into multiple image areas by connecting the scene identifier and the centroid. By adaptively constructing the multi-fork tree to iteratively divide the level of the image area based on the number of feature points, and dynamically selecting coordinate points based on the visual characteristics of the scene area, making the characteristics of the selected coordinate points more significant and more evenly distributed, thereby improving the accuracy of matching the first feature information with the second feature information and improving the accuracy of user positioning in large scenes.

Further, in an embodiment, the position of each coordinate point relative to the centroid of the scene identifier in the first scene image can be recorded as the coordinate point position. It can be understood that since the relative position between the centroid and the scene identifier in the first scene image is known, the position of the coordinate point relative to the scene identifier position can be calculated according to the position of the coordinate point relative to the centroid. Therefore, recording the position of the coordinate point relative to the centroid is equivalent to recording the position of the coordinate point relative to the scene identifier position.

Further, in an embodiment, step S206 includes:

if there are multiple feature points in the image area of the sub-node of the target node, selecting the feature point with the largest grayscale environment gradient value from the multiple feature points as the coordinate point in the image area.

If there are multiple feature points in the image area of the sub-node of the target node, the gradient values of the multiple feature points in the grayscale environment can be calculated, and the feature point with the largest gradient value is selected from each feature point as the coordinate point in the image area. The feature point with the largest gradient value has the most significant characteristics, so selecting this feature point as the coordinate point can make the characteristics of the coordinate point more significant.

Further, in an embodiment, as shown in FIG. 5, finding the target coordinate point where the first feature information matches the second feature information from each of the coordinate points in step S40 includes:

step S401, using the first-level image area including the identifier to be measured as a target image area.

In order to improve the speed of finding the target coordinate point, when the first scene image and the second scene image are the same image, the first-level image area including the identifier to be measured can be determined first, and the first-level image area can be used as the target image area. In a specific implementation, two scene identifiers closest to the position of the identifier to be measured in the first scene image can be selected from the scene identifiers, and the image area sandwiched by the lines connecting the two scene identifiers and the centroid in each first-level image area is used as the first-level image area including the identifier to be measured, that is, as the target image area. It can be understood that the position of the identifier to be measured in the first scene image (the identifier position to be measured) reflects the user's position in the scene area. The closer the position of the identifier to be measured in the first scene image is to which scene identifier, the closer the user is to which scene identifier in the scene area. Therefore, the user is most likely to be in the area sandwiched by the lines connecting the two scene identifiers closest to the user identifier and the centroid, that is, the target coordinate point is most likely to be in the target image area.

Step S402, finding the target coordinate point that the first feature information matches the second feature information from the coordinate points in the target image area.

After determining the target image area, the search can be started from the coordinate points in the target image area. Since the target coordinate point is most likely to be in the target image area, starting the search from the coordinate points in the target image area can increase the speed of matching to the target coordinate point.

Further, in an embodiment, step S402 includes:

performing a first-order traversal in the multi-fork tree starting from the sub-node corresponding to the target image area to find the target coordinate point that the first feature information matches the second feature information from each of the coordinate points.

After determining the target image area, the first-order traversal can be performed in the multi-fork tree starting from the sub-node corresponding to the target image area. That is, each leaf node under the sub-node corresponding to the target image area is first traversed, and then each leaf node of the sub-node corresponding to the first-level image area except for the target image area are traversed. Each time a leaf node is traversed, the first feature information of the coordinate point in the image area corresponding to the leaf node is matched with the second feature information at the identifier position to be measured. If the match is successful, the coordinate point in the image area corresponding to the leaf node is used as the target coordinate point. If the match is unsuccessful, the next leaf node is traversed.

Since the target coordinate point is most likely to be within the target image area, traversing first from the coordinate point within the target image area can increase the speed of finding the target coordinate point.

Further, in an embodiment, when there are multiple first scene images and the scene areas are obtained by combining the areas contained in each first scene image, the multi-fork tree can be constructed for each first scene image respectively, and then multi-fork trees are combined into a single multi-fork tree, that is, a new root node is generated, and the root node of each multi-fork tree is used as the sub-node of the newly generated root node. When searching for the target coordinate point, the combined multi-fork tree is traversed.

Third Embodiment

On the basis of the above-mentioned first embodiment and/or second embodiment, as shown in FIG. 6, in step S20 of the identifier positioning method in the above-mentioned embodiment, extracting the first feature information corresponding to each of the coordinate points according to the image information of the first scene image can also include step S208, and extracting the second feature information at the identifier position to be measured according to the identifier position to be measured in step S30 can also include step S301, which will be introduced below. In this embodiment, content that is the same or similar to the above-mentioned first embodiment can refer to the above description, and will not be described again.

Step S208, using a preset sampling window to sample the position of the coordinate point in the first scene image, in order to obtain the first feature information of the coordinate point based on the image information of the sampling point.

In this embodiment, a sampling window, that is, the preset sampling window, can be set in advance, and the preset sampling window is used to sample the position of the coordinate point to obtain the first feature information of the coordinate point. Window parameters such as the shape, size, and number of sampling points of the preset sampling window can be set as needed, and are not limited in this embodiment. For example, in an embodiment, a circular sampling window can be used.

For each coordinate point, the preset sampling window is used for sampling. In an embodiment, the preset sampling window can be placed in the first scene image so that the coordinate points fall within the preset sampling window, and the pixel points falling within or on the preset sampling window from the first scene image can be sampled. The sampling method is limited by the number of sampling points, sampling interval and other window parameters. Multiple sampling points are obtained by sampling according to the sampling method limited by the window parameters. The first feature information of the coordinate point is obtained according to the image information of the sampling point. In an embodiment, the image information of the sampling point can be combined to obtain the first feature information of the coordinate point. In this embodiment, the combination method is not limited.

Step S301, using the preset sampling window to sample the identifier position to be measured in the second scene image, in order to obtain the second feature information at the identifier position to be measured based on the image information of the sampling point.

In the second scene image, the preset sampling window is also used to sample the identifier position to be measured to obtain the second feature information at the identifier position to be measured. For details, reference may be made to the above-mentioned sampling method of the first feature information, which will not be described in detail here.

In this embodiment, by using a sampling frame to sample, the first feature information of the coordinate point is obtained based on the image information of the sampling point, which can improve the representation ability of the first feature information to represent the visual features at the coordinate point (the representation ability is the ability to represent the difference between the visual features at the coordinate point and visual features at other coordinate points, and the more accurately the difference is represented, the stronger the representation ability). Similarly, by using the sampling frame to sample, the second feature information at the identifier position to be measured is obtained based on the image information of the sampling point, which can also improve the representation ability of the second feature information to represent the visual features at the coordinate point, improve the accuracy of matching the second feature information with the first feature information, avoid positioning errors caused by mismatches, and improve positioning accuracy.

Figure 7:
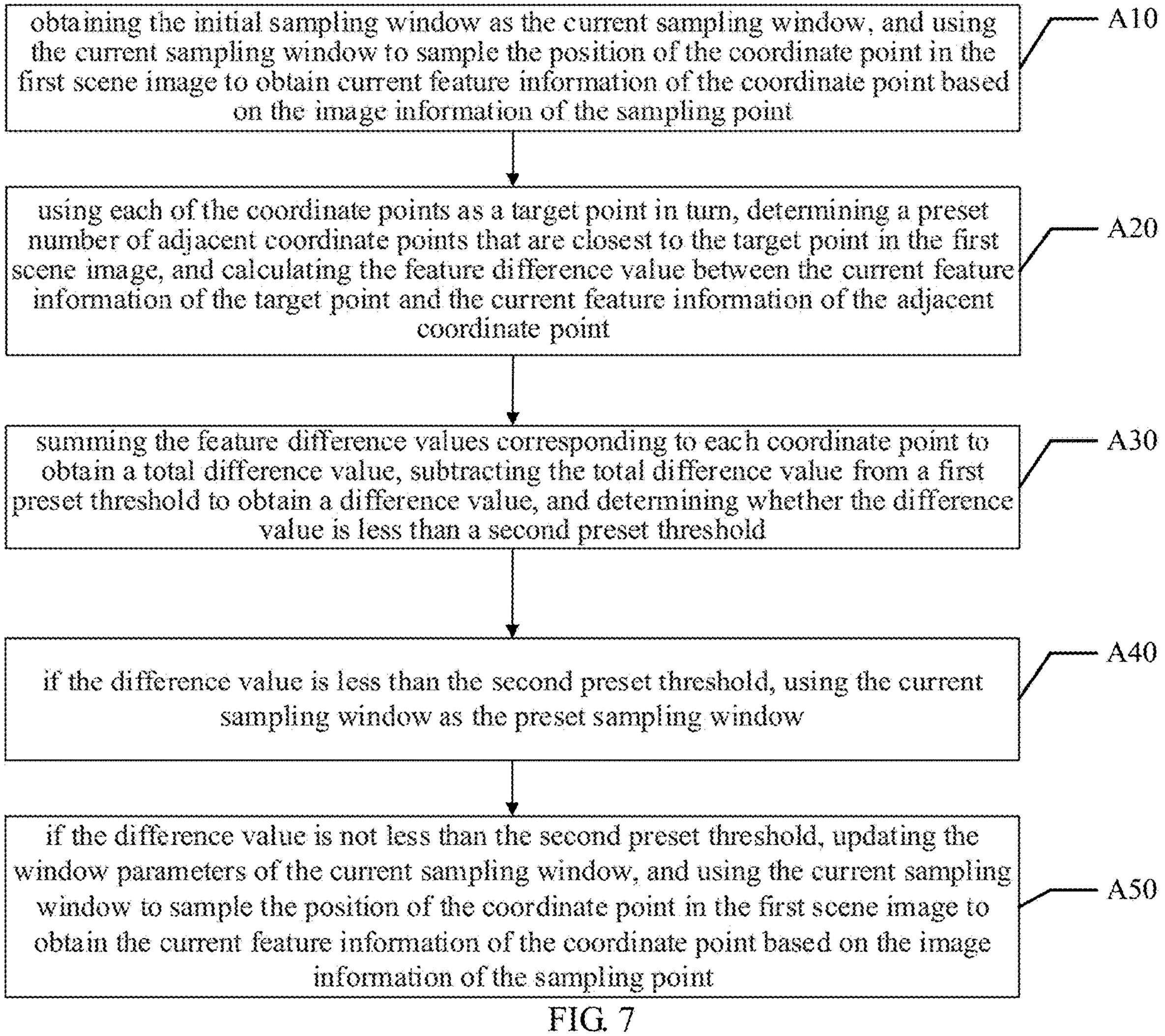
FIG. 7 is a schematic flowchart of an identifier positioning method according to an embodiment of the present application.

Further, in an embodiment, as shown in FIG. 7, before step S208, the method also includes:

step A10, obtaining the initial sampling window as the current sampling window, and using the current sampling window to sample the position of the coordinate point in the first scene image to obtain current feature information of the coordinate point based on the image information of the sampling point.

In order to further improve the representation ability of the first feature information and the second feature information, the pre-sampling window can be obtained through training. Through the training process, it is expected to find the sampling window that can make the overall representation ability of the first feature information of each coordinate point in the first scene image the strongest.

In an embodiment, a sampling window can be initialized, and the window parameters of the sampling window can be initialized according to experience. This sampling window is used as the current sampling window and enters the first round of training.

For each coordinate point, the current sampling window is used to sample the position of the coordinate point in the first scene image to obtain the feature information of the coordinate point based on the image information of the sampling point (hereinafter referred to as the current feature information). In an embodiment, the method of sampling to obtain the current feature information can refer to the above-mentioned sampling method of the first feature information, which will not be repeated here.

Step A20, using each of the coordinate points as a target point in turn, determining a preset number of adjacent coordinate points that are closest to the target point in the first scene image, and calculating the feature difference value between the current feature information of the target point and the current feature information of the adjacent coordinate point.

After obtaining the current feature information corresponding to each coordinate point, each coordinate point can be used as the target point in turn. For the target point, a preset number of coordinate points (hereinafter referred to as adjacent coordinate points) closest to the target point (distance on the first scene image) are determined from each coordinate point except the target point. The preset number can be set as needed, for example, set to 3. After determining the adjacent coordinate points of the target point, the feature difference values between the current feature information of the target point and the current feature information of each adjacent coordinate point are calculated respectively. The method for calculating the feature difference value between the two feature information is not limited here, for example, it can be to calculate the Hamming distance between the two feature information.

After traversing each coordinate point, at least one feature difference value corresponding to each coordinate point can be obtained.

Step A30, summing the feature difference values corresponding to each coordinate point to obtain a total difference value, subtracting the total difference value from a first preset threshold to obtain a difference value, and determining whether the difference value is less than a second preset threshold.

The feature difference values corresponding to each coordinate point are summed to obtain the total difference value. The magnitude of the total difference value represents the overall representation ability of the current feature information of each coordinate point to the visual characteristics of each coordinate point. The greater the total difference value, the stronger the overall representation ability.

Two thresholds (hereinafter referred to as the first preset threshold and the second preset threshold respectively) can be set in advance according to experience. The first preset threshold is set to be larger and the second preset threshold is set to be smaller.

Step A40, if the difference value is less than the second preset threshold, using the current sampling window as the preset sampling window.

If the difference value obtained by subtracting the total difference value from the first preset threshold is less than the second preset threshold, it means that the total difference value is large and the representation ability of the current feature information is relatively strong. At this time, the current sampling window can be used as the preset sampling window and the training of the sampling window can be stopped.

Step A50, if the difference value is not less than the second preset threshold, updating the window parameters of the current sampling window, and using the current sampling window to sample the position of the coordinate point in the first scene image to obtain the current feature information of the coordinate point based on the image information of the sampling point.

If the difference between the first preset threshold minus the total difference value is not less than the second preset threshold, it means that the total difference value is small and the representation ability of the current feature information is relatively weak, and it is also necessary to find a sample window that can sample feature information with stronger representation ability. At this time, the window parameters of the current sampling window can be updated, and based on the current sampling window after updating the window parameters, performing the step of using the current sampling window to sample the position of the coordinate point in the first scene image to obtain the current feature information of the coordinate point based on the image information of the sampling point in step A20, that is, performing the next round of training based on the current sampling window after updating the window parameters.

The window parameters of the sampling window can include one or more of window size, window shape, and number of sampling points, which are not limited in this embodiment. The updating method of window parameters is not limited in this embodiment. For example, the following objective function can be constructed:

$$L=\gamma-\theta(\alpha)$$

$\gamma$ is the first preset threshold, $\theta$ ($\alpha$) is the function method for calculating the total difference value, a represents the window parameter, and the training goal is to optimize L so that it continues to decrease. $\alpha$ can be updated through the gradient descent method to optimize L.

Further, in an embodiment, as shown in FIG. 8, the preset sampling window is a circular sampling window, and the step S208 includes:

step S2081, placing the center of the circular sampling window at the coordinate point in the first scene image, performing sampling from the circular sampling window to obtain N sampling points, and obtaining the grayscale values of the N sampling points according to the image information of the first scene image.

When the circular sampling window is used to sample a coordinate point, the center of the circular sampling window can be placed at the coordinate point, and sampling is performed from the circular sampling window to obtain N sampling points. N is the number of sampling points and is the window parameter of the circular sampling window. The window parameters can also include the rotation step, the sampling starting point and the window radius. The sampling starting point specifies which point on the circular sampling window to start sampling from, and the rotation step refers to the angle of rotation from the sampling starting point to determine the next sampling point. The window radius is the radius of the circular sampling window.

After the N sampling points are obtained by sampling, the grayscale values corresponding to the N sampling points can be obtained according to the image information of the first scene image.

Step S2082, if the grayscale value of the i-th sampling point is greater than the grayscale value of the i+1-th sampling point, setting the description information of the i-th sampling point to 1, where $1\le i\le N-1$.

Step S2083, if the grayscale value of the i-th sampling point is not greater than the grayscale value of the i+1-th sampling point, setting the description information of the i-th sampling point to 0.

Step S2084, obtaining the first feature information of the coordinate point according to the description information of the 1st to (N−1) sampling points.

The N sampling points can be sorted according to their arrangement order on the circular sampling window, generally taking the sampling starting point as the first sampling point. For the i-th sampling point, the grayscale value of the i-th sampling point can be compared with the grayscale value of the (i+1)-th sampling point. If the grayscale value of the i-th sampling point is greater than the grayscale value of the (i+1)-th sampling point, the description information of the i-th sampling point can be set to 1. If the grayscale value of the i-th sampling point is not greater than the grayscale value of the (i+1)-th sampling point, the description information of the i-th sampling point can be set to 0, where $1\le i\le N-1$. After obtaining the description information of the 1st to (N−1) sampling points, the first feature information of the coordinate point can be obtained according to the description information of the 1st to (N−1) sampling points. In an embodiment, the description information of the 1st to (N−1) sampling points can be composed into a vector in order. It can be understood that the vector is a vector including only 0 and 1.

Corresponding to the above-mentioned first embodiment, second embodiment and third embodiment, an embodiment of the present application also provides an identifier positioning device. The identifier positioning device includes an identification module, a first extraction module, a second extraction module and a match module.

The identification module is configured to identify the scene identifier of the scene area in the first scene image to obtain the scene identifier position.

The first extraction module is configured to select a plurality of coordinate points from the first scene image, extract the first feature information corresponding to each coordinate point according to the image information of the first scene image, and record the coordinate point position of each coordinate point relative to the scene identifier position in the first scene image respectively.

The second extraction module is configured to identify the identifier to be measured in the second scene image of the scene area to obtain the position of the identifier to be measured, and extract the second feature information at the position of the identifier to be measured according to the position of the identifier to be measured.

The match module is configured to search for a target coordinate point where the first feature information matches the second feature information from each of the coordinate points, and calculate the position of the identifier to be measured in the scene area according to the coordinate point position corresponding to the target coordinate point and the scene identifier position.

Further, the scene identifier is arranged at the endpoints of the scene area, and the endpoints encloses the scene area.

The first extraction module includes an extraction unit, a dividing unit and a selection unit.

The extraction unit is configured to extract feature points in the first scene image.

The dividing unit is configured to determine the centroid of the first scene image, and divide the first scene image into a plurality of first-level image areas according to the connecting line between each of the scene identifiers and the centroid.

The selection unit is configured to select at least one feature point as a coordinate point from the first-level image area.

Further, the first extraction module also includes a first determination unit, a judgment unit and a second determination unit.

The first determination unit is configured to use the centroid as the root node of the multi-fork tree, use each of the first-level image areas as sub-nodes of the root node in the multi-fork tree, and initialize the target node to the root node.

The judgment unit is configured to judge whether the number of feature points in the image area of each sub-node of the target node is greater than a preset number.

The second determination unit is configured to determine one of the feature points from the image area of each sub-node of the target node as a coordinate point in the corresponding image area, if the number of feature points in the image area of each sub-node of the target node is not greater than the preset number.

Further, the first extraction module also includes a loop unit.

The loop unit is configured to divide, if the number of feature points in the image area of each sub-node of the target node is greater than the preset number, the image area of each sub-node of the target node into a plurality of image areas of the next level, and use each image area of the next level as the sub-node corresponding to the image area of the previous level, update the target node to each sub-node of the target node in sequence, and judge whether the number of feature points in the image area of each sub-node of the target node is greater than the preset number.

Further, the second determination unit is also configured to select the feature point with the largest grayscale environment gradient value from the multiple feature points as the coordinate point in the image area, if there are multiple feature points in the image area of the sub-node of the target node.

Further, the match module includes a third determination unit and a search unit.

The third determination unit is configured to use the first-level image area including the identifier to be measured as the target image area.

The search unit is configured to find the target coordinate point where the first feature information matches the second feature information from the coordinate points in the target image area.

Further, the search unit is also configured to perform the first order traversal in the multi-tree starting from the sub-node corresponding to the target image area, to find the target coordinate point where the first feature information matches the second feature information from the coordinate points.

Further, the first extraction module includes a first sampling unit.

The first sampling unit is configured to sample the position of the coordinate point in the first scene image using the preset sampling window to obtain the first feature information of the coordinate point based on the image information of the sampling point.

The second extraction module includes a second sampling unit.

The second sampling unit is configured to sample the position of the identifier to be measured in the second scene image using the preset sampling window, to obtain the second feature information at the position of the identifier to be measured based on the image information of the sampling point.

Further, the device also includes a sampling module, a first determination module, a calculation module, a second determination module and a loop module.

The sampling module is configured to obtain the initial sampling window as the current sampling window, and use the current sampling window to sample the position of the coordinate point in the first scene image, to obtain the current feature information of the coordinate point based on the image information of the sampling point.

The first determination module is configured to use each coordinate point as a target point in turn, determine a preset number of adjacent coordinate points closest to the target point in the first scene image, and calculate the feature difference value between the current feature information of the target point and the current feature information of the adjacent coordinate point.

The calculation module is configured to sum the feature difference values corresponding to the coordinate points to obtain a total difference value, subtract the total difference value from the first preset threshold to obtain a difference value, and determine whether the difference value is less than the second preset threshold.

The second determination module is configured to use the current sampling window as the preset sampling window if the difference value is less than the second preset threshold.

The loop module is configured to update, if the difference value is not less than the second preset threshold, the window parameters of the current sampling window, and call the sampling unit to perform the step of sampling the position of the coordinate point in the first scene image using the current sampling window to obtain the current feature information of the coordinate point based on the image information of the sampling point.

Further, the preset sampling window is a circular sampling window, and the first sampling unit is also configured to.

- place the center of the circular sampling window at the coordinate point in the first scene image, obtain N sampling points by sampling from the circular sampling window, and obtain the grayscale values of the N sampling points according to the image information of the first scene image;
- if the grayscale value of the i-th sampling point is greater than the grayscale value of the (i+1)-th sampling point, set the description information of the i-th sampling point to 1, where $1 \le i \le N-1$;
- if the grayscale value of the i-th sampling point is not greater than the grayscale value of the (i+1)-th sampling point, set the description information of the i-th sampling point to 0; and
- obtain the first feature information of the coordinate point according to the description information of the 1st to (N−1) sampling points.

In the embodiments of the present application, for content that is the same as or corresponds to first embodiment, second embodiment or third embodiment, please refer to the above introduction and will not be described again.

The identifier positioning device of the present application adopts the identifier positioning method provided in the above-mentioned first embodiment, and solves the existing technical problem of high hardware cost when relying on expensive external auxiliary devices for use positioning in large scenes. Compared with the related art, the beneficial effects of the identifier positioning device provided by the embodiment of the present application are the same as those of the identifier positioning method provided by the above-mentioned first embodiment, and other technical features in the system are the same as those disclosed in the first embodiment, and will not be repeated here.

Fifth Embodiment

An embodiment of the present application provides an electronic device. The electronic device includes: at least one processor; and a memory communicatively connected to the at least one processor. An instruction that can be executed by at least one processor are stored in the memory, and the instruction is executed by at least one processor, so that at least one processor can execute the identifier positioning method in the above-mentioned first embodiment.

Figure 11:
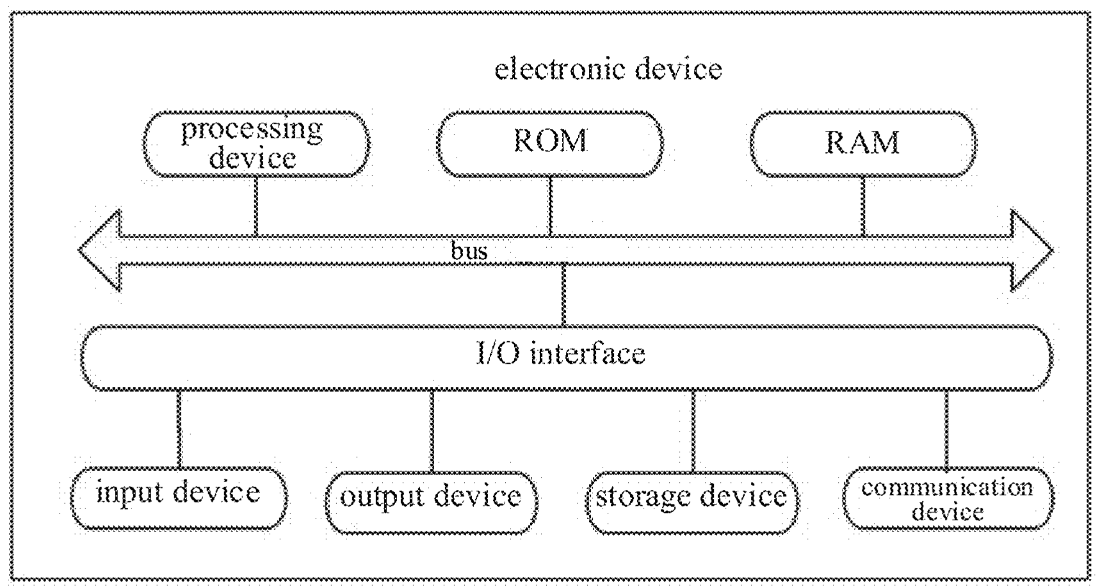
FIG. 11 is a schematic structural diagram of a device of a hardware operating environment involved in the identifier positioning method according to an embodiment of the present application.

Referring to FIG. 11, which shows a schematic structural diagram of an electronic device suitable for implementing embodiments of the present application. The electronic devices in embodiments of the present application can include, but are not limited to, a mobile terminal such as a mobile phone, a laptop, a digital broadcast receiver, a personal digital assistant (PDA), PAD, a portable multimedia player (PMP), a vehicle-mounted terminal (e.g. a vehicle-mounted navigation terminal) and a fixed terminal such as a digital TV, a desktop computer. The electronic device shown in FIG. 4 is only an example and should not impose any limitations on the functions and scope of use of the embodiments of the present application.

As shown in FIG. 11, the electronic device can include a processing device (such as a central processing unit, a graphics processor, etc.) that can perform various appropriate actions and processing according to a program stored in a read-only memory (ROM) or a program loaded from a storage device into a random access memory (RAM). In the RAM, various programs and data required for the operation of the electronic device are also stored. The processing device, ROM and RAM are connected to each other via a bus. An input/output (I/O) interface is also connected to the bus.

Typically, the following systems can be connected to the I/O interface: input devices including, for example, touch screens, touch pads, keyboards, mice, image sensors, microphones, accelerometers, gyroscopes, etc.; output devices including, for example, liquid crystal displays (LCD), speakers, vibrators, etc.; storage devices including, for example, tapes, hard disks, etc.; and communication devices. The communication device can allow the electronic device to communicate wirelessly or wiredly with other devices to exchange data. Although the electronic devices having various systems are illustrated in the drawings, it should be understood that it is not required to implement or have all illustrated systems. Alternatively, more or fewer systems can be implemented or provided.

In particular, according to embodiments of the present application, the processes described above with reference to the flowcharts can be implemented as computer software programs. For example, embodiments of the present application include a computer program product including a computer program carried on a computer-readable medium, the computer program containing program code for performing the method illustrated in the flowchart. In such embodiments, the computer program can be downloaded and installed from the network through the communication device, or installed from a storage device, or installed from a ROM. When the computer program is executed by the processing device, the above-mentioned functions defined in the method of the embodiment of the present application are performed.

The electronic device provided by the present application adopts the identifier positioning method in the above-mentioned first, second or third embodiment to solve the existing technical problem of high hardware cost when relying on expensive external auxiliary devices for user positioning in large scenes.

Compared with the related art, the beneficial effects of the electronic device provided by the embodiment of the present application are the same as those of the identifier positioning method provided in the first embodiment, and other technical features of the electronic device are the same as those disclosed in the first embodiment, and will not be repeated here.

It should be understood that various parts of the present application can be implemented in hardware, software, firmware, or combinations thereof. In the above description of the embodiments, specific features, structures, materials or characteristics can be combined in a suitable manner in any one or more embodiments or examples.

The above are only specific embodiments of the present application, but the scope of the present application is not limited thereto. Changes or substitutions that can be easily thought of by any person familiar with the technical field within the technical scope disclosed by the present application should be covered by the scope of the present application. Therefore, the scope of the present application should be subject to the scope of the claims.

Sixth Embodiment

This embodiment provides a computer-readable storage medium having a computer-readable program instruction stored thereon. The computer-readable program instruction is used to execute the user positioning method in the first embodiment.

The computer-readable storage medium provided by the embodiment of the present application can be, for example, a USB flash drive, but is not limited to electrical, magnetic, optical, electromagnetic, infrared, or semiconductor systems, systems or devices, or any combination thereof. More specific examples of computer readable storage media can include, but are not limited to, electrical connections with one or more wires, portable computer disks, hard drives, random access memory (RAM), read only memory (ROM), erasable programmable read-only memory (EPROM or flash memory), optical fibers, portable compact disk read-only memory (CD-ROM), optical storage devices, magnetic storage devices, or any suitable combination of the above. In this embodiment, the computer-readable storage medium can be any tangible medium that contains or stores a program, which can be used by or in connection with an instruction execution system, system, or device. The program code contained on the computer-readable storage medium can be transmitted using any suitable medium, including but not limited to: wires, optical cables, radio frequency (RF), etc., or any suitable combination of the above.

The above-mentioned computer-readable storage medium can be included in the electronic device; or exist independently without being assembled into the electronic device.

The computer-readable storage medium carries one or more programs. When the one or more programs are executed by the electronic device, the electronic device: identifies the scene identifier of the scene area in the first scene image to obtain the scene identifier position of the scene identifier in the first scene image; selects a plurality of coordinate points from the first scene image, extracts the first feature information corresponding to each coordinate point according to the image information of the first scene image, and respectively records the coordinate point position of each coordinate point in the first scene image relative to the scene identifier position; identifies the identifier to be measured in the second scene image of the scene area to obtain the position of the identifier to be measured, and extracts the second feature information at the position of the identifier to be measured according to the position of the identifier to be measured; finds the target coordinate point where the first feature information matches the second feature information from each of the coordinate points, and calculates the position of the identifier to be measured in the scene area according to the coordinate point position corresponding to the target coordinate point and the position of the scene identifier in the scene area.

Computer program code for performing the operations of the present application can be written in one or more programming languages or combination thereof, including object-oriented programming languages such as Java, Smalltalk, C++, and conventional procedural programming language such as "C" or a similar programming language. The program code can be completely or partly executed on the user's computer, executed as an independent software package, partly executed on the user's computer and partly on a remote computer, or entirely executed on the remote computer or server In situations involving remote computers, the remote computer can be connected to the user's computer through any kind of network, including a local area network (LAN) or a wide area network (WAN), or can be connected to an external computer (for example, using internet service providers to connect through the internet).

The flowcharts and block diagrams in the drawings illustrate the possible architecture, functions and operations of systems, methods and computer program products according to various embodiments of the present application. In this regard, each block in the flowchart or block diagram can represent a part of a module, program segment or code that contains one or more executable instructions for implementing a specified logical function. It should also be noted that, in some alternative implementations, the functions indicated in the block can also occur in a different order than those indicated in the drawing. For example, two blocks shown in succession can actually be executed substantially in parallel, or sometimes executed in the reverse order, depending on the function involved. It should also be noted that each block in the block diagram and/or flowchart, and a combination thereof, can be implemented by a dedicated hardware-based system that performs a specified function or operation, or can be implemented by a combination of specialized hardware and computer instructions.

The modules described in the embodiments of the present application can be implemented by means of software or hardware. The name of the module does not constitute a limitation on the unit itself under certain circumstances.

The computer-readable storage medium provided by the present application stores the computer-readable program instruction for executing the above identifier positioning method, and solves the existing technical problem of high hardware cost when relying on expensive external auxiliary devices for user positioning in large scenes. Compared with the related art, the beneficial effects of the computer-readable storage medium provided by the embodiments of the present application are the same as those of the identifier positioning method provided by the above-mentioned first, second or third embodiment, and will not be described again.

Each embodiment in this specification is described in a parallel or progressive manner. Each embodiment focuses on its differences from other embodiments. The same or similar parts between the various embodiments can be referred to each other. As for the device disclosed in the embodiment, since it corresponds to the method disclosed in the embodiment, the description is relatively simple. For relevant details, please refer to the description in the method.

Those skilled in the art can also understand that the units and algorithm steps of each example described in conjunction with the embodiments disclosed herein can be implemented by means of electronic hardware, computer software or a combination of both. In order to clearly illustrate the interchangeability of hardware and software, the composition and steps of each example have been generally described according to functions in the above description. Whether these functions are performed in hardware or software depends on the specific application and design constraints of the technical solution. Skilled artisans can implement the described function using different methods for each specific application, but such implementations should not be considered beyond the scope of the present application.

The steps of the methods or algorithms described in conjunction with the embodiments disclosed herein can be implemented directly by means of hardware, software modules executed by a processor, or a combination of both. The software modules can be located in random access memory (RAM), memory, read-only memory (ROM), electrically programmable ROM, electrically erasable programmable ROM, registers, hard disks, removable disks, CD-ROMs, or any other form of storage media known in the technical field.

It should be noted that, as used herein, relational terms such as first, second, etc. are used only to distinguish one entity or operation from another and do not necessarily require or imply any such actual relationship or order between these entities or operations. In addition, the terms "include", "comprise" or any other variation thereof are intended to cover a non-exclusive inclusion, such that a process, method, article or system that includes a list of elements not only includes those elements, but also includes other elements that are not explicitly listed or elements that are inherent to the process, method, article or system. Without further limitations, an element defined by the statement "includes a . . . " does not exclude the presence of other identical elements in the process, method, article, or system that includes that element.

What is claimed is:

1. An identifier positioning method, applied to an electronic device, the electronic device comprising a processor, the processor being configured to perform operations of the identifier positioning method, wherein the identifier positioning method comprises:

identifying a scene identifier of a scene area in a first scene image to obtain a scene identifier position of the scene identifier in the first scene image;

selecting a plurality of coordinate points from the first scene image, extracting first feature information corresponding to each of the coordinate points according to image information of the first scene image, and recording a coordinate point position of each of the coordinate points in the first scene image relative to the scene identifier position;

identifying an identifier to be measured in a second scene image of the scene area to obtain an identifier position to be measured, and extracting second feature information at the identifier position to be measured according to the identifier position to be measured; and finding a target coordinate point where the first feature information matches the second feature information from each of the coordinate points, and calculating a position of the identifier to be measured in the scene area according to a coordinate point position corresponding to the target coordinate point and the position of the scene identifier in the scene area, wherein the scene identifier is arranged at each end point of the scene area, each of the end points are enclosed to form the scene area, and selecting the plurality of coordinate points from the first scene image comprises:

extracting a feature point in the first scene image;

determining a centroid of the first scene image, and dividing the first scene image into a plurality of first-level image areas according to a connecting line between each of the scene identifiers and the centroid; and selecting at least one feature point from the first-level image area as a coordinate point.

2. The identifier positioning method of claim 1, wherein after determining the centroid of the first scene image, and dividing the first scene image into the plurality of first-level image areas according to the connecting line between each of the scene identifiers and the centroid, the method further comprises:

using the centroid as a root node of a multi-fork tree, using each of the first-level image areas as a sub-node of the root node in the multi-fork tree, and initializing a target node as the root node;

determining whether a number of feature points in an image area of each sub-node of the target node is greater than a preset number; and in response to that the number of feature points in the image area of each sub-node of the target node is not greater than the preset number, determining one of the feature points from the image area of each sub-node of the target node as a coordinate point in a corresponding image area.

3. The identifier positioning method of claim 2, wherein after determining whether the number of feature points in the image area of each sub-node of the target node is greater than the preset number, the method further comprises:

in response to that the number of feature points in the image area of each sub-node of the target node is greater than the preset number, dividing the image area of each sub-node of the target node into a plurality of image areas of secondary level, using each of the image areas of secondary level as a sub-node corresponding to the image area of first level, updating the target node to each sub-node of the target node in sequence, and determining whether the number of feature points in the image area of each sub-node of the target node is greater than the preset number.

4. The identifier positioning method of claim 2, wherein determining one of the feature points from the image area of each sub-node of the target node as the coordinate point in the corresponding image area comprises:

in response to that there are multiple feature points in the image area of the sub-node of the target node, selecting a feature point with a largest grayscale environment gradient value from the multiple feature points as the coordinate point in the image area.

5. The identifier positioning method of claim 2, wherein finding the target coordinate point where the first feature information matches the second feature information from each of the coordinate points comprises:

using the first-level image area comprising the identifier to be measured as a target image area; and finding the target coordinate point where the first feature information matches the second feature information from each of the coordinate points in the target image area.

6. The identifier positioning method of claim 5, wherein finding the target coordinate point where the first feature information matches the second feature information from each of the coordinate points in the target image area comprises:

performing a first order traversal in the multi-fork tree starting from a sub-node corresponding to the target image area, to find the target coordinate point where the first feature information matches the second feature information from each of the coordinate points.

7. An identifier positioning apparatus, comprising:

an identification module, configured to identify a scene identifier of a scene area in a first scene image to obtain a scene identifier position;

a first extraction module, configured to select a plurality of coordinate points from the first scene image, extract first feature information corresponding to each of the coordinate points according to image information of the first scene image, and respectively record a coordinate point position of each of the coordinate points relative to the scene identifier position in the first scene image;

a second extraction module, configured to identify an identifier to be measured in a second scene image of the scene area to obtain an identifier position to be measured, and extract second feature information at the identifier position to be measured according to the identifier position to be measured; and a match module, configured to find a target coordinate point that the first feature information matches the second feature information from each of the coordinate points, and calculate a position of the identifier to be measured in the scene area according to a coordinate point position corresponding to the target coordinate point and the scene identifier position.

8. An electronic device, comprising:

at least one processor; and a memory communicated with the at least one processor, wherein an instruction executable by the at least one processor is stored in the memory, and the instruction is executed by the at least one processor to enable the at least one processor to perform the identifier positioning method of claim 1.

9. A non-transitory computer-readable storage medium, wherein a program for implementing an identifier positioning method is stored in the non-transitory computer-readable storage medium, and the program for implementing the identifier positioning method is executed by a processor to implement the identifier positioning method of claim 1.

* * * * *